United States Patent
Nair et al.

(10) Patent No.: US 11,310,226 B2
(45) Date of Patent: Apr. 19, 2022

(54) GESTURE AND MOTION DETECTION USING A DEVICE RADAR COMPONENT FOR USER AUTHENTICATION

(71) Applicant: PAYPAL, INC., San Jose, CA (US)

(72) Inventors: Rahul Nair, Leander, TX (US); Raquel Buckley, Austin, TX (US); Alex Courtade, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 438 days.

(21) Appl. No.: 16/226,543

(22) Filed: Dec. 19, 2018

(65) Prior Publication Data

US 2020/0204541 A1 Jun. 25, 2020

(51) Int. Cl.
*H04W 12/68* (2021.01)
*H04L 29/06* (2006.01)
*G01S 7/41* (2006.01)

(52) U.S. Cl.
CPC .......... *H04L 63/0853* (2013.01); *G01S 7/415* (2013.01); *H04L 63/107* (2013.01)

(58) Field of Classification Search
CPC ................... H04L 63/107; G06F 21/36; G06F 2221/2111; H04W 12/68
See application file for complete search history.

(56) References Cited

U.S. PATENT DOCUMENTS

| | | |
|---|---|---|
| 2008/0182232 A1 | 7/2008 | Bannwolf et al. |
| 2011/0256932 A1 | 10/2011 | Kim et al. |
| 2012/0084146 A1 | 4/2012 | Zwicky |
| 2012/0330834 A1 | 12/2012 | Aidasani et al. |
| 2013/0123008 A1 | 5/2013 | Kim et al. |
| 2013/0123011 A1 | 5/2013 | Nguyen et al. |
| 2014/0149208 A1 | 5/2014 | Zwicky |
| 2015/0049017 A1 | 2/2015 | Weber et al. |
| 2015/0161375 A1* | 6/2015 | Ghosh .................... G06F 21/36 726/7 |

(Continued)

OTHER PUBLICATIONS

Shukran et al., "Kinect-based Gesture Password Recognition," Faculty of Science and Defence Technology, University Pertahanan Nasional Malaysia, 2012, pp. 492-499, vol. 6, Issue 8, Australian Journal of Basic and Applied Sciences, Jordan.

(Continued)

*Primary Examiner* — Olugbenga O Idowu
(74) *Attorney, Agent, or Firm* — Haynes and Boone, LLP

(57) ABSTRACT

There are provided systems and methods for gesture and motion detection using a device radar component for user authentication. A user's device may include a miniaturized radar component that is capable of detecting objects, gestures, and motions within an area around the device in a three-dimensional manner, such as a user hand, arm, or other body part that may perform a motion or gesture. A service provider, application, or another user may generate and transmit an authentication request to the user that may include some query for the user to perform one or more actions or gestures. The user may perform the actions or gestures in response to the query, which may be detected by the radar component and processed to determine whether to authenticate the user. In some embodiments, the gesture may be performed using a virtual projection or real objects in the environment nearby the device.

20 Claims, 8 Drawing Sheets

(56) References Cited

U.S. PATENT DOCUMENTS

| | | |
|---|---|---|
| 2015/0209675 A1 | 7/2015 | Chang et al. |
| 2015/0212585 A1 | 7/2015 | Latta et al. |
| 2015/0256528 A1 | 9/2015 | Turgeman |
| 2015/0262269 A1 | 9/2015 | Zamer |
| 2015/0277569 A1 | 10/2015 | Sprenger et al. |
| 2016/0359904 A1 | 12/2016 | Ben Ezra et al. |
| 2017/0070511 A1 | 3/2017 | Jarous et al. |
| 2017/0076089 A1 | 3/2017 | Turgeman |
| 2017/0097413 A1 | 4/2017 | Gillian et al. |
| 2017/0149759 A1* | 5/2017 | Wyn-Harris ............ G06F 21/36 |
| 2017/0345003 A1 | 11/2017 | Spears et al. |
| 2018/0158060 A1* | 6/2018 | Adams .................... G07F 19/20 |
| 2018/0234447 A1 | 8/2018 | Mueen et al. |
| 2020/0074065 A1* | 3/2020 | Zhang ................. G05D 1/0016 |

OTHER PUBLICATIONS

Xu, Pei, "A Real-time Hand Gesture Recognition and Human-Computer Interaction System," Department of Electrical and Computer Engineering, arXiv 1704.07296, Apr. 24, 2017, pp. 1-8, Cornell University, Ithaca, New York.

Google, "Google Project Soli", 14 pages, [online], [retrieved on Oct. 15, 2018]. Retrieved from the Internet: <URL:https://atap.google.com/soli/>.

Snow, Jackie, "A Hand Gesture Could Be Your Next Password," [online], [retrieved on Sep. 6, 2018]. [Retrieved from the Internet: <URL:https://fastcompany.com/90214588/a-hand-gesture-could-be-your-next-password>.

Aumi et al., "AirAuth: Evaluating In-Air Hand Gestures for Authentication," Mobile HCI '14, Sep. 23-26, 2014, pp. 1-9, ACM SIG CHI. <URL: https://dl.acm.org/citation.cfm?id=2628388>.

\* cited by examiner

GESTURE AND MOTION DETECTION USING A DEVICE RADAR COMPONENT FOR USER AUTHENTICATION

TECHNICAL FIELD

The present application generally relates to electronic authentication and more particularly to authentication through radar detection using miniaturized radar components.

BACKGROUND

Bad actors may use computing devices in an automated fashion to perform brute force attacks, overwhelm online service provider resources, and/or access unauthorized resources or accounts. For example, a malicious user may utilize a computing bot that executes a scripted attack to perform credential stuffing (e.g. determining valid account credentials to perform an account takeover). Account takeover may permit unauthorized and/or fraudulent account access, enabling data theft and other negative actions. Applicant recognizes that preventing and mitigating automated attacks is desirable to improve computer security.

Figure 1:
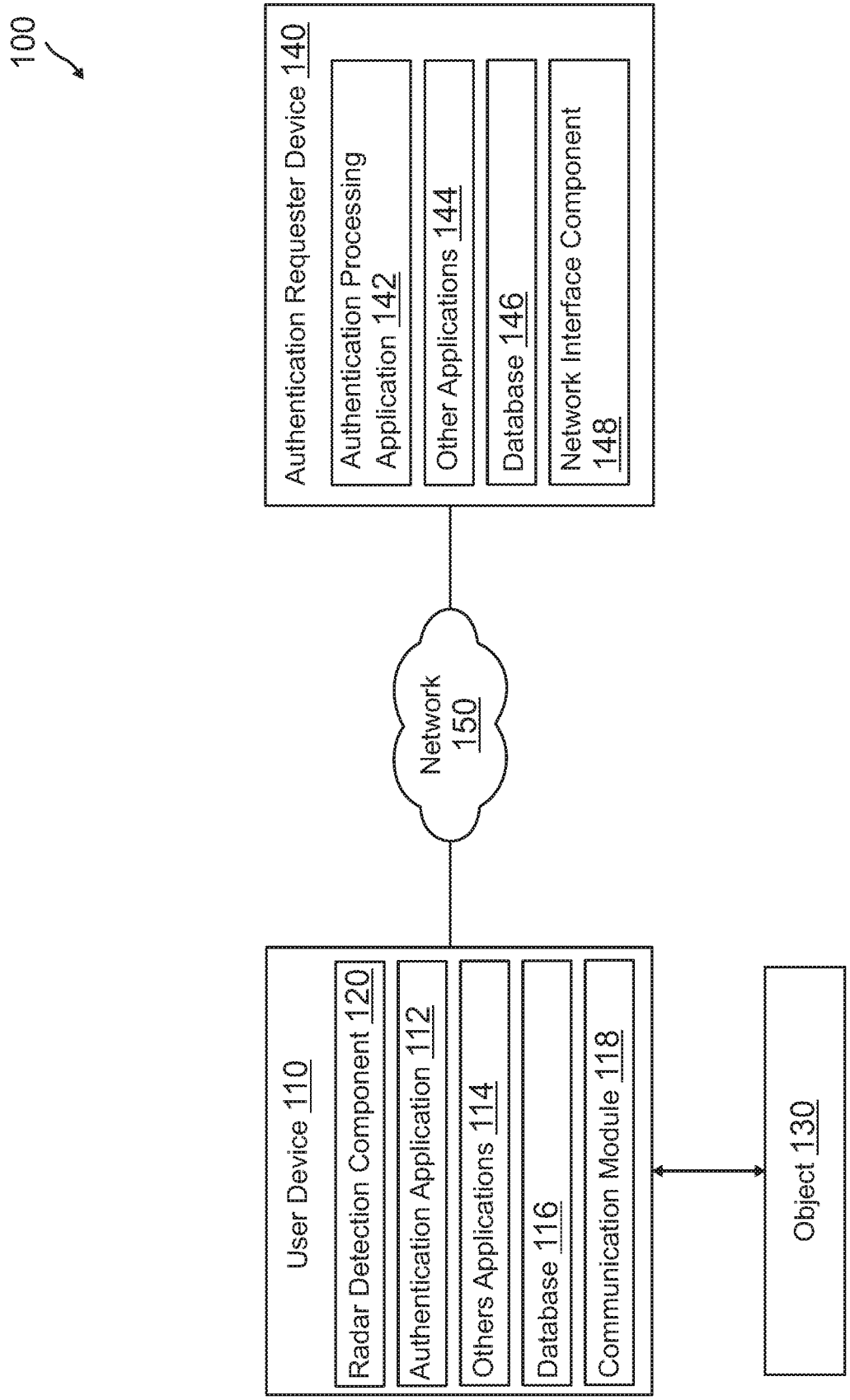
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In order to determine whether a computing device is acting in an automated fashion, various tests may be performed in order to tell apart humans and computers. While organizations have taken measures to improve security (e.g., requiring more robust passwords, using 2-factor authentication, implementing security phrases, etc.), not all measures can prevent bad actors from performing automated attacks on an account and/or attempt to access other protected virtual or real-world items or areas. For example, Completely Automated Public Turing test to tell Computers and Humans Apart (CAPTCHA) tests may request that the computing device repeat letters shown to the user or select images. However, bad actors have utilized advancements in technology and computing capabilities to defeat such tests. Thus, service providers may require more robust bot detection capabilities in order to protect from fraudulent or malicious computing attacks and processes.

This disclosure includes techniques related to user authentication via gesture and motion detection using a device radar component. In particular, customizable challenges (which can involve user-specific data or other specific data) may be created that require a solution via gesture and motion. Such challenges may be particularly difficult for automated attacks (e.g. scripted attacks) to overcome. This can provide a benefit over CAPTCHA and other techniques that have become increasingly susceptible to artificial intelligence/machine learning and are continuing to become easier to overcome without an actual human present. It can be useful to slow down or stop automated attacks by providing challenges that are not easily overcome by machine intelligence, as this can reduce the volume of attacks and/or exploits by orders of magnitude (e.g. attackers may no longer may be able to make thousands of attempts in just a few minutes). Systems suitable for practicing methods of the present disclosure are also provided.

In one embodiment, a user device may include capabilities to image or otherwise capture gestures, motions, actions, or other stationary or fluid movements of a user in a three-dimensional (3D) space. For example, a miniaturized radar component in a computing device (e.g., a mobile phone, tablet computer, personal computer such as a laptop, or point-of-sale (POS)/terminal device) may be capable of sensing a 3D motion and objects within an area in proximity to the device through imaging the area using radio waves. (Note that any of the above devices may be variously referred to as a user device, user computing device, etc.)

The radar of such a device may utilize radio waves projected in an area around the radar transceiver to detect various properties of objects by analyzing reflected radio waves sensed by the transceiver of the radar. For example, the radar's transceiver may include a transmitting antenna that projects radio waves into an environment around the radar, and a receiving antenna that may detect reflected radio waves that may be processed by the radar to detect the location, physical shape, motion, and/or other properties of the object within the environment of the radar's radio wave transmissions and reflections. In some embodiments, a miniaturized radar system may utilize a millimeter wave (mm-Wave) transceiver on a single semiconductor chip package that may be integrated into a computing device to provide radar detection. However, other types of radar systems capable of being incorporated within a computing device may also be utilized. For example, X-Band radar sensors may also utilize radiation within the microwave spectrum to provide miniaturized radar components that function with computing devices to provide radar capabilities.

A device may also include a camera that may capture images or video of a scene, which may include optical, infrared, ultraviolet, or other types of radiation sensing components, that may work with (or independently from) the radar detection component. The device may further include additional components that may capture information associated with the user's gesture or motion, such as a GPS locator or other location detection component that may determine a geo-location of the device and/or a route traveled by the device. Additionally, the device may include microphone and audio recording components, as well as an audio processing feature to process voice input, such as a voice-to-text process. The device may also include a transceiver that may allow for wireless communications with one or more other devices or servers, including over cellular communications (e.g., 3G, 4G, 4G Long Term Evolution (LTE), 5G, other $3^{rd}$ Generation Partnership Project (3GPP)-based cellular communications), or other types of wireless communications.

Such a user's computing device may be utilized to perform authentication of a user in response to an authentication request and query. The authentication request may be performed based on a request to access an account, a request to access a web page, a request to access other particular data, or a request to access a virtual or real item, object, or location. For example, a user may attempt to access an account, perform an account action (e.g., an electronic funds transfer, or another electronic transaction processing request for a payment account), and/or change/view account information, such as authentication credentials, personal/financial information, etc. The access request may be for a secure database, website, or other online location/resource (though is not limited as such). The access request by the user may also be for a real object or location, such as access to a home, work location, secure area, safe or other lockable object, or electronic device (e.g., a mobile phone). In some embodiments, the access request by the user may come in response to another user allowing access to the real/virtual thing if the user is capable of answering the authentication request correctly. For example, Alice may allow Bob to access her home, personal computer, or online account if Bob can answer the authentication request correctly. Thus, Bob may receive the authentication request based on Alice's initial request to allow Bob access.

An authentication request may also come in response to a challenge to determine whether a user is a human or an automated bot performing a script-based attack, such as credential stuffing during attempted account takeovers. Credential stuffing may utilize an automated script that causes a computing device to check multiple (e.g., thousands) of potentially compromised account credentials by checking each individual username and password or other authentication credentials with the service platform that provides that account. For example, an email or payment provider platform may provide accounts to perform various actions, where account credentials may be compromised due to phishing, malware, keyloggers, or other malicious action by a bad actor. Thus, the bad actor may test many potentially compromised credentials to determine if one or more allow access to the account and allow the bad actor to perform an account takeover. In such situations, in order to detect bot usage, a Completely Automated Public Turing test to tell Computers and Humans Apart (CAPTCHA) like test may attempt to authenticate that the device is being used by a human and not a bot-based action, which not be as effective as in the past.

In one embodiment, a service provider may generate an authentication request for the user, which may include a challenge or other query for the user to respond to in order to provide the access requested by the user. The authentication request may include a request for the user to perform a 3D gesture, action, or motion (note that the terms gesture, action, and motion may refer generally to some kind of movement and are not mutually exclusive unless otherwise indicated) that is captured by the user's device in three dimensions and processed to determine if the user correctly performed the corresponding gesture or motion. The authentication query may therefore utilize the radar detection component of user's device to detect the user's gesture or motion in 3D, and may record data (e.g., a radar image or video) of the user's performance to determine whether the user can be authenticated.

In some embodiments, the authentication request may be specific to the user using known user data for the user. For example, user data or a user profile may include physical proportions (e.g., height, weight, etc.), physical characteristics of the user, other past physical data of the user, and/or queries/challenges answered by or preferred by the user. The user data may also include location data for a current location of the user, which may be determined using a geo-location of the user. The location data may include real objects in a location around the user, as well as other users within that location and spatial relationships between objects/users in the location and size of the location. The location data may be known or may be detected by the radar detection component of the user's device. The user data may also include known objects in possession of the user, such as rings/jewelry, a briefcase/purse, a mobile device, eyeglasses, or other object that is normally or known to be kept on the user. The authentication request may be generated by a service provider using the aforementioned information, as well as stored or available queries/challenges. In other embodiments, the user's device or another device may generate the query/challenge for the request. Challenges can also be generated using past transactional data for a user and can be combined with other techniques. For example, a map could be projected requiring a user to gesture at a particular location a user last engaged in a transaction using a particular payment service, then gesture at an item purchased (where several alternatives may be displayed).

The authentication request may ask the user to perform a gesture, such as using a hand, arm, or other body part. For example, the user may be requested to hold up a certain number or pattern of fingers, move their wrist in a direction, and/or bend their elbow in a direction. The authentication request may also ask (or otherwise require) the gesture to be performed over time so that the user is in motion when the 3D data is captured by the device's radar detection component. In further embodiments, the user may be asked to perform an action, motion, or gesture with a real object, such as touch a pen or other object in an environment, move the object in a certain manner, identify a certain person or item within the environment, or otherwise move or manipulate the real item. In some embodiments, the query may also be performed with virtual objects, which may be displayed on display screen of a device and/or projected into an environment around or in proximity to the device using a holographic or other virtual projector capable of displaying virtual objects in 3D.

For example, a holographic projector may be implemented in the computing device and/or connected with or in communication with the computing device or service provider during the authentication request. The holographic projector may correspond to a device capable of displaying holographic images of a light field, for example, using diffraction, to create a 3D image or video. The holographic image(s) may then include the challenge for the user to identify, move, interact with, or otherwise manipulate with a hand, arm, another object, etc., in order to respond to the authentication request. A video projector may also be capable of displaying or projecting images or video onto a surface, such as a two-dimensional (2D) image that includes the challenge for the user to perform the gesture/motion with. For example, a holographic or video projection may display one or more screws in a sequence, where the user is required to rotate or screw in each screw a certain amount, number of rotations, or in a specific sequence. The projection may also include locks that may be manipulated in a certain order or to move the locks or components of the locks to certain positions. Other types of virtual objects may also be used, such as rings to move or select, sliders, buttons, dials, dots to connect or identify, balls or another object to rotate or move, etc. The holographic display and authentication request may be more complex, such as identifying color patterns/changes, selecting objects, letters, or words to respond to a query and fill in missing portions, or other more complex iterations.

In some embodiments, the query may be specific to an item or other thing that the user knows. For example, if the user has a briefcase on their person or commonly carries one, the user may be required to manipulate the real briefcase's (or a virtual projection of the briefcase) locks a certain amount or in a certain order, where only the user would know the location and type of locks on the briefcase. The user may also be required to move a piece of real or virtual jewelry, such as a ring, earring, or necklace, a certain amount or in a certain way to answer the authentication request. The user may also view a map of the user's known location or a location known to the user and select or point out specific items, such as where their car is parked, where their room/office may be located in a house or work environment, or other data specific to the user. The user may also be required to trace their route to a location or to arrive at the user's current or expected location. In further embodiments, the other user that is allowing the user access may establish the query or challenge for the user, where the other user may select the challenge based on known data for the user or may provide the instructions to the user (e.g., through text message, a voice call, in-person, etc.) so that the user may authenticate themselves. Thus, in some embodiments, the user's device may receive and display instructions for the user to complete the challenge, where the instructions are provided by another user and/or a service provider.

In order to authenticate the user in response to the authentication request, the radar detection component of the user's device may activate in response to outputting the authentication request and may capture 3D data of the user's gesture or motion. The user may perform the gesture/motion based on the challenge in the request, which may correspond to 3D data. Utilizing radar detection through transmitted and reflected/received radio waves, the radar detection component may rebuild 3D data of the user's gesture/motion, as well as sensing other objects/users in the environment that the user may interact with. The 3D data of the user's response to the authentication request may be detected, stored, transmitted, and/or processed to determine whether the user has passed the authentication request and/or answered correctly. In some embodiments, the 3D data may be transmitted to a service provider requesting the authentication (e.g., for account access, to perform an action, and/or during a CAPTCHA-like test). In other embodiments, the user's device may have or receive solution data for the authentication request, which may include the required 3D data to answer the query correctly, and may process the detected data with the solution to determine whether the user's gesture/motion matches the solution (which may include a degree of error or difference to allow for uniqueness of individual responses).

In other embodiments, the 3D data may be transmitted to another device, such as an electronic lock, keypad, mobile device, etc., which may determine whether the user may be provided access based on the challenge and the proper solution. Moreover, in some embodiments, the user's device may not include the radar detection component, and the other device may instead capture the user's motion. For example, a door, lock, or mobile device may be in proximity to the user, and the user may view the authentication request on their device or the other device. The user may then perform the action in the environment, where the other device may capture the 3D data and authenticate the user. In some embodiments, the other user providing the access to the user may perform the gesture(s)/motion(s) instead of the user, and the 3D data of the other user may be sent to the other device of the door, lock, etc., or the user's device. If sent to the other device, the device may determine whether the other user performed the required 3D motion based on the received 3D data and may provide access to the user. In embodiments where the 3D data is sent to the user's device, the user's device may rebuild the waveforms of the 3D data of the other user and may utilize a radar component to transmit those waveforms in the user's environment. The device of the lock, door, etc., may capture the rebuilt waveforms and provide access to the user.

Thus, an authentication request that utilizes 3D data of a user's gesture and/or motion may provide better detection of bots or script-based attacks due to the complexity of answering correctly using gestures and motions in a 3D space. This provides increased security to devices, online service providers, and other entities requiring digital security. Moreover, by adapting the authentication query or challenge to known or accessible data specific to a certain user or device, the authentication query may be more likely to be answered by only one or a select few individuals in a 3D manner so that a bot may be less likely to fake or attempt to brute force an answer to the authentication request. Additionally, the authentication request may be specific to certain environments, preventing correctly answering and accessing secure real or virtual items, objects, spaces, or other things without access to the environment at the time of the authentication query. Thus, remote attacks by bots or bad actors are minimized.

FIG. 1 is a block diagram of a system 100 suitable for implementing techniques described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 10Q, as shown, includes a user device 110, an object 130, and a service provider server 140 configured to communicate over a network 150. User device 110 may be utilized by a user to capture data of object 130 in three-dimensions during performance of an action with and/or by object 130 and authenticate a user (not shown) associated with user device 110. User device 110 may therefore include a radar capable of imaging a scene, environment, and/or object 130 in three-dimensions. User device 110 may receive or generate an authentication request having a challenge to complete in 3D with or using object 130. Additionally, service provider server 140 may also be used to generate and provide data for the authentication request and may process 3D data in response to the request to authenticate the user.

User device 110 and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 140. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. User device 110 may also include or correspond to a device for a location, electronic lock, access keypad, vehicle, another user's mobile device, or other device that may provide access to a real or virtual object, item, or location. Although only one device is shown, a plurality of devices may function similarly and/or be connected to provide the functionalities described herein.

User device 110 of FIG. 1 contains radar detection components 120, an authentication application 112, other applications 114, a database 116, and a communication module 118. Authentication application 112 and other applications 114 may correspond to executable processes, procedures, and/or applications with associated hardware. In other embodiments, user device 110 may include additional or different modules having specialized hardware and/or software as required.

Radar detection components 120 correspond to a hardware and/or software feature of user device 110 that assists in capturing three-dimensional (3D) data of object 130 related to performance of a gesture, action, and/or motion with object 130. In various embodiments, radar detection components 120 may include one or more transceivers configured to transmit radio waves and detect reflected radio waves in order to image objects in 3D and determine objects' positions, movement, and/or speed of movement (e.g., velocity, acceleration, etc.). A radar of radar detection components 120 may include a transmitting antenna connected to a transmitter that is configured to transmit radio waves of a specific wavelength and/or waveform within a space or environment around user device 110, which is some embodiments may further be directionally configured to emit the radio waves in a specific direction. The radar component further includes a receiver and a receiving antenna that detects radiation scattered by objects, such as object 130, when the object is within the beam of transmitted electromagnetic waves. The receiving antenna may detect the scattering and reflecting of the waves, and the receiver may detect and determine the objects position, 3D shape, movement, and other property.

A radar component of radar detection components 120 may be miniaturized to fit within, on, or connect to user device 110 in a small package. For example, a single semiconductor chip package or small package of multiple chips may support mmWave (millimeter wavelength) and/or X-Band (microwave wavelength) radars that may be implemented within a device. However, other wavelengths and/or radar package sizes may also be utilized to perform the described functionalities herein. The radar component may utilize a continuous-wave radar system that emits a continuous radio wave, including frequency modulated continuous-wave radar. In other embodiments, a direct-sequence spread spectrum may be utilized to reduce signal interference.

In various embodiments, radar detection components 120 may include a camera, which corresponds to an optical device of user device 110 enabling user device 110 to capture or record images, including still and/or video images, in three dimensions. Radar detection components 120 may correspond to a digital camera on user device 110 (e.g., incorporated in user device 110 such as a mobile phone's digital camera in a traditional camera orientation and/or a forward facing camera orientation that captures one or more users as they use and view a display screen of user device 110) or associated with user device 110 (e.g., connected to user device 110 but not incorporated within a body or structure of user device 110), or may more generally correspond to any device capable of capturing or recording an image, video, or other digital media data, including infrared imaging or other types imaging devices. The captured image may be of object 130. As a digital camera, radar detection components 120 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of radar detection components 120 may include various features, such as zoom, flash, focus correction, shutter speed controls, or other various features usable to capture one or more images or videos of the user and/or other users or objects.

In certain embodiments, radar detection components 120 may include a location detection component capable of detecting a location of user device 110, for example, through a GPS locator and service, triangulation process, mapping application, check-in process/feature, wireless communications, or other location detection process. Radar detection components 120 may be used to determine a location of user device 110, which may be utilized when generating and/or responding to an authentication request with object 130. Moreover, the location and/or location parameters may be determined by radar detection components 120 and shared with or utilized by service provider server 140 when determining an authentication request. Radar detection components 120 may include other media capture components, including a microphone to capture audio data. A microphone of radar detection components 120 may be used to capture voice data. Radar detection components 120 may further include a navigational component and/or application, such as a compass, as well as a gyroscope, accelerometer, or other component that may detect an orientation of user device 110.

Radar detection components 120 may also include software components that may interact with the hardware components to facilitate data determination, such as radar and camera controllers.

Authentication application 112 may correspond to one or more processes to execute modules and associated software/hardware of user device 110 to capture 3D data of object 130 and/or other objects in response to outputting an authentication request, and authenticate a user associated with user device 110 in response to the 3D data and the authentication request. In this regard, authentication application 112 may correspond to specialized software utilized by user device 110 to first receive or generate an authentication request, for example, in response a request to access a virtual or real item, account, object, location, or another thing. Authentication application 112 may be a standalone software component or may be partially or wholly integrated into other software present on user device 110 (e.g. as part of a payments application such as that provided by PayPal™, cryptocurrency application, security authentication application, or another application.)

An access request may be generated through use of authentication application 112 or through another application of user device 110, such one or more of other applications 114. In other embodiments, the access request may occur through a real-world interaction by the user, based on an access permission granted by another user, or through a request to use a service of service provider server 140. An authentication request may be received from service provider server 140 based on the access request or may be generated by user device 110 using user data for the user, as well as other known data, such as location data for a location of user device 110. For example, user data may correspond to data known about the user, including user measurements, objects in possession of the user, or information known to the user (e.g., a number or placement of objects in relation to the user or other objects). The authentication request may further include a challenge or query to complete with or using object 130, which may correspond to performance of a gesture or motion. Additionally, instructions and/or solution data for the authentication query may be received and/or generated by authentication application 112.

Authentication application 112 may output the authentication query for performance by the user associated with user device 110, which may include instructions and/or a projection using a display device or holographic display of a puzzle, challenge, or other query for use, manipulation of, and/or solving by the user. Instructions for solving the authentication query may be output, such as a method of suing, number of times to use, or other process manipulate a displayed 3D projection or image using object 130. Authentication application 112 may utilize radar detection components 120 to capture 3D data of object 130 in response to the authentication request, e.g., specific movements in three dimensions of object 130. The 3D data may correspond to reflected radio waves scattered by object 130 during a gesture or motion in response to the authentication query. The 3D data may be processed by authentication application 112 to authenticate the user for a process or access or may be sent to service provider server 140 for processing.

In some embodiments, once authenticated, authentication application 112 may be utilized to transmit a transaction processing request to service provider server 140, which may include the transaction information and account information or another payment instrument. Authentication application 112 may also receive and/or provide transaction histories and/or results based on the transaction processing, which may be communicated to a device at the location for authorization and/or confirmation of the transaction processing. In various embodiments, authentication application 112 may correspond to a general browser application configured to retrieve, present, and communicate information over the Internet (e.g., utilize resources on the World Wide Web) or a private network. However, in other embodiments, authentication application 112 may include a dedicated application of service provider server 140 or other entity (e.g., a merchant), which may be configured to assist in authenticating a user and processing transactions electronically.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 15Q, or other types of applications. Other applications 114 may include a browser application, dedicated application of a service provider or merchant, and/or financial application, which may require user authentication using authenticating application 112. Other applications 114 may also include email, texting, voice and IM applications that allow a user to send and receive emails, calls, texts, and other notifications through network 150, including messaging utilized by authentication application 112. Other applications 114 may also include other location detection applications, which may be used to determine a location for user device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers. Other applications 114 may interface with authentication application 112 to utilize authentication processes using 3D detected radar data, or one or more of the processes provided by authentication application 112 and other applications 114 may exist in the same application.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with authentication application 112 and/or other applications 114, identifiers associated with hardware of user device 110, or other appropriate identifiers, such as identifiers used for payment/user/device authentication or identification, which may be communicated as identifying the user/user device 110 to service provider server 140. Moreover, database 116 may include received and/or generated authentication requests with corresponding instructions for completion and/or 3D solution data required to be detected by radar detection components 120. Further, 3D detected data in response to one or more authentication requests may be stored to database 116. Other information (not shown) may of course be present on user device 110.

User device 110 includes at least one communication module 118 adapted to communicate with service provider server 140 and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications.

Object 130 may correspond to a real or virtual object with which a user performs some gesture or motion to authenticate the user in response to an authentication request to perform the gesture/motion. In some embodiments, object 130 may correspond to one or more of a hand, one or more fingers of a hand, an arm, a leg, a head, or one or more body parts of a person, which may be used to perform a gesture or motion based on a challenge or query in an authentication request. Object 130 may also correspond to a real-world object that a user is required to move using a body part and may also include both the real-world object and the user body part. In some embodiments, object 130 may include a virtual object projected in a real-world environment for use by a user, which may include the virtual object and one or more body parts of the user that interact with the virtual object. In some embodiments, object 130 may correspond to multiple real or virtual objects, as well as one or more real or virtual objects and their corresponding environment, such as a room, building, or other space. Thus, the gesture or movement performed with object 130 may be captured by radar detection components 120 of user device 110 when performing user authentication.

Service provider server 140 may be maintained, for example, by an online service provider, which may provide authentication services using 3D radar detected data, as well as other online services, such as transaction processing services. In this regard, service provider server 140 includes one or more processing applications which may be configured to interact with user device 110 and/or another device/server to facilitate authentication of users using radar detected data, and other services requiring user authentication. In one example, service provider server 140 may be provided by PAYPAL®, Inc. of San Jose, Calif., USA. However, in other embodiments, service provider server 140 may be maintained by or include another type of service provider, which may provide authentication services to a plurality of users. (In various embodiments however, the techniques described with respect to service provider server 140 can be used with any computer system and are not limited to the computer systems of a service provider).

Service provider server 140 of FIG. 1 includes an authentication processing application 142, other applications 144, a database 146, and a network interface component 148. Authentication processing application 142 and other applications 144 may correspond to executable processes, procedures, and/or applications with associated hardware. In other embodiments, service provider server 140 may include additional or different modules having specialized hardware and/or software as required.

Authentication processing application 142 may correspond to one or more processes to execute modules and associated specialized hardware of service provider server 140 to provide and/or process authentication requests to perform a 3D gesture or motion in response to an authentication request having a challenge or query to perform the gesture/motion that is specific to the user. In this regard, authentication processing application 142 may correspond to specialized hardware and/or software to receive an access request from user device 110 and/or from another user to allow access to user device 110 and/or the user associated with user device 110 to a real or virtual item, account, object, and/or location. The access request may be to access and utilize the thing by the user associated with user device 110 or may be to allow the user to access and utilize the thing by the other user if the user associated with user device 110 properly answers (i.e., performs) the authentication request.

In order to challenge the user associated with user device 110 and authenticate the user, authentication processing application 142 may utilize data specific to the user to generate an authentication query for the user. The user data may include personal information specific to the user, such as user measurements, items or objects in possession of the user or known to the user, preferences for the user, known query responses or past successful authentications through 3D data, or other user information, including transactional data associated with an electronic payment account—dates, times, locations, and amounts of transactions; listing of one or more goods or services purchased; funding source (e.g. particular credit card, debit card, account balance, etc.); destination address (e.g. physical address or email address, phone number) of something purchased; name and/or location of a seller; or other transaction related information. The user data may also include currently detected data of the user, such as a geo-location, parameters of the user detected by user device 110 through radar detection components 120, and/or location parameters detected through radar detection components 120.

Using the user data, authentication processing application 142 may generate a query that requests the user to perform a gesture or motion, which may include gestures or motions performed with real or virtual objects. For example, the query may request that the user move object 130 (e.g., a body part) in a specific manner. In other embodiments, object 130 may also or instead correspond to a physical object in an environment not part of the user, where the user may perform a gesture or motion with the real object. A virtual projection may also be part of the authentication request, where the user is challenged to move object 130 in relation to the virtual projection. In some embodiments, instructions may be sent to user device 110 for the user to perform the particular gestures, or the instruction may assist the user in correctly responding to the authentication request. In some embodiments, the data necessary to generate the authentication request (e.g., the user data) may be sent to user device 110 and/or another device to generate the authentication request. In some embodiments, the authentication request may be received from a device of another user, and the authentication request may be provided to user device 110 or the device provide access to the user associated with user device 110.

After transmission of the authentication request to user device 110, authentication processing application 142 may receive 3D data of the user detected in response to the user performing the authentication request. Authentication processing application 142 may process the 3D data with corresponding solution data for the 3D gestures, motions, or other actions/movements that are required to be detected using radar detection components 120 and recorded in the 3D data. The solution data may therefore include other radar data or data necessary to interpret the 3D radar detected data and determine whether to authenticate the user as correctly answering (performing) the challenge in the authentication request. If so, the user may be authenticated for the requested access. However, if not, the user may be challenged again in another authentication request, or user device 110 may be flagged as a bot, fraudulent party, or bad action and reported for security processing and risk assessment/access denial. In other embodiments, user device 110 may authenticate the user using the 3D data, or the other device that provides access to the user may authenticate the user after receiving the 3D data from user device 110 and/or service provider server 140. Note that in some embodiments, however, it is possible for some or all of an authentication to be performed by user device 110 (e.g. trusted secure software on that device could potentially authenticate the 3D data).

In some embodiments, authentication processing application 142 may provide transaction processing services, where a user may establish a payment account with authentication processing application 142 by providing personal and/or financial information to service provider server 140 and selecting authentication credentials. In various embodiments, the financial information may include payment instrument information, such as account/card numbers and information. The account may be used to send and receive payments. The payment account may be accessed and/or used through a browser application and/or dedicated payment application executed by user device 110, such as authentication application 112. Authentication processing application 142 may receive a payment request from user device 110 for the transaction data by the account, which may include identifiers, tokens, or other data used for transaction processing. Authentication processing application 142 may process a payment and may provide a transaction history to user device 110 and/or a merchant device for transaction authorization, approval, or denial.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing service provider server 140, where the user or other users may interact with the GUI to more easily view and communicate information. In various embodiments, other applications 144 may include additional connection and/or communication applications, which may be utilized to communicate information to over network 150.

Additionally, service provider server 140 includes database 146. Database 146 may store various identifiers associated with user device 110. Database 146 may also store account data, including payment instruments and authentication credentials, as well as transaction processing histories and data for processed transactions. Database 146 may store authentication requests and user data necessary to generate authentication requests, as well as solution data to correctly answer the authentication requests. Additionally, 3D radar detected data in response to one or more authentication requests may be stored to database 146.

In various embodiments, service provider server 140 includes at least one network interface component 148 adapted to communicate user device 110 and/or another device/server for a merchant over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
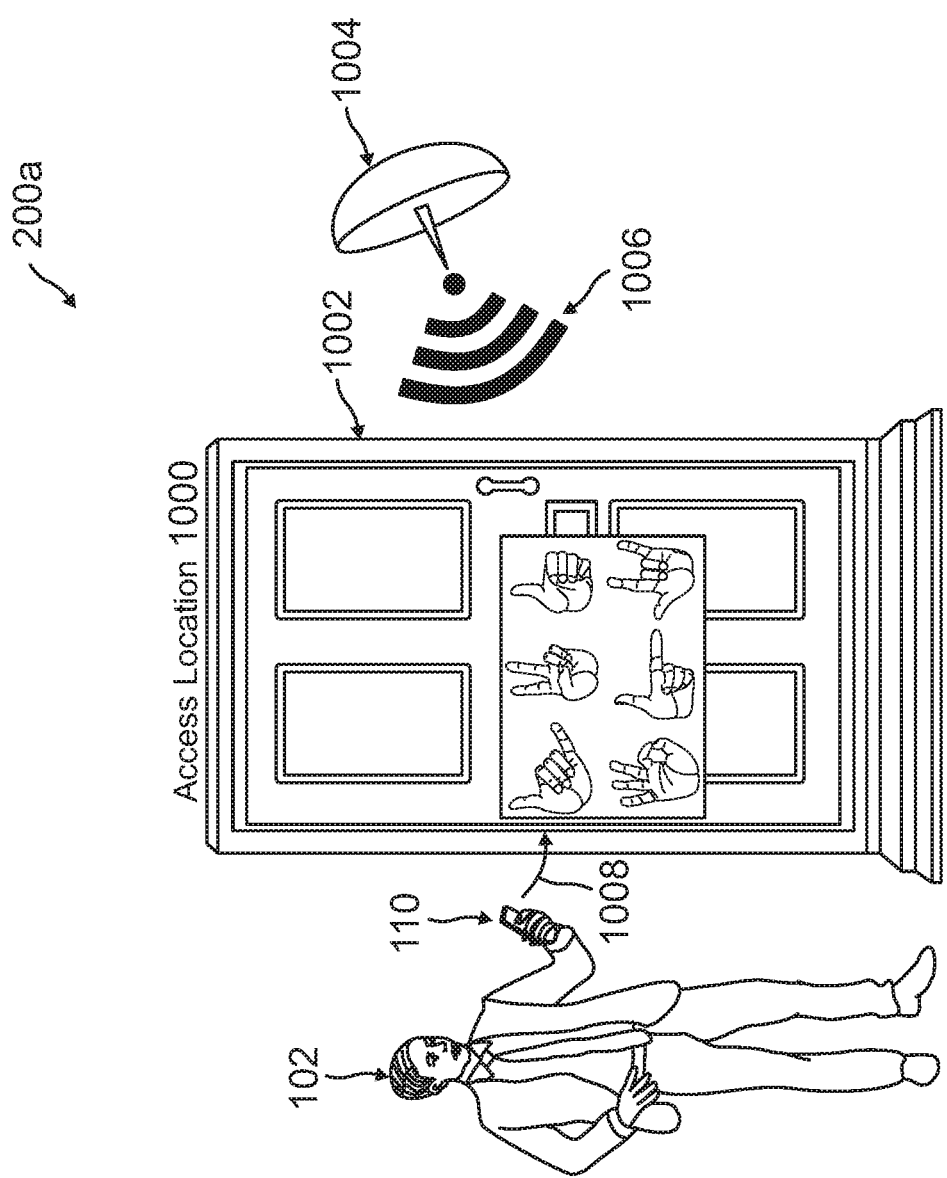
FIG. 2A is an exemplary real-world environment where a user may utilize gesture detection through a radar component for authentication and access to a location or object, according to an embodiment.

FIG. 2A is an exemplary real-world environment where a user may utilize gesture detection through a radar component for authentication and/or access to a location or object, according to an embodiment. Environment 200a of FIG. 2A includes user device 110 discussed in reference to system 100 of FIG. 1. In this regard, user device 110 may provide an authentication request that includes gestures or motions required to be performed by a user 102 at an access location 1000 to provide user 102 with access to access location 1000.

In environment 200a, user 102 may wish to gain access to access location 1000, which may be blocked by door 1002 that may be electronically opened using a lock connected to a device. In this regard, a radar 1004 may capture gestures and motions made by user 102 in response to an authentication query in order to authenticate user 102 as being both human (e.g., not a bot) and as a user that receives and correctly responds to the authentication request having instructions for responding to the authentication request to gain the access. For example, radio waves 1006 may be emitted by radar 1004 that may capture 3D data of user 102 through radio wave scattering and reflection by user 102 when user 102 is in the environment of access location 1000. Although access location 1000 is shown with door 1002 as a real location, in other embodiments, access location 1000 may correspond to access to an object, such as a safe or other lockable object, vehicle, or mobile device instead of door 1002. Additionally, user 102 may instead be requesting access to an electronic, digital, or virtual item, object, location, or account, which may be accessed through authentication in a manner similar to that discussed in reference to FIG. 2A. More particularly, in numerous embodiments the user will actually be attempting to access a resource that is controlled by one or more other computer systems—such as attempting to access a user account, a particular online database, attempting to perform a payment transaction, etc., as described below.

After user 102 requests access using user device 110 and/or a device/component associated with access location 1000, the authentication request may be generated and/or transmitted to user device 110 and radar 1004 that includes a query or challenge that must be completed by the user to open door 1002 and gain access to access location 1000. The query may be generated specifically for user 102, for example, using user data for user 102 and other information specific to user 102. In some embodiments, the query may be generated using user information, parameters, known possessions or items associated with the user, and/or information known to the user.

The query may include instructions to complete one or more gestures or motions or may include a more complex test that requires that the user perform certain actions with a real or virtual object in environment 200a and/or perform an action only the user (or a limited number of people) would know, such as a past action performed by the user and/or with an object known to the user. For example, the user may be required to perform certain moves that the user has previously performed (e.g., a dance). In some embodiments, user device 110 and/or the service provider may detect that user device is wearing an article of clothing, such as a tie or belt, or in possession of an object, which may be used to generate the authentication request. For example, user 102 may be holding another item or in possession of another item, such as a briefcase or user device 110. The authentication request may ask the user to perform a gesture or action using the object, such as by moving a combination lock or other component of a briefcase, pushing a button specific to user device 110, adjusting a belt or tie that user 102 is wearing, or otherwise performing an action that is specific to user 102.

For example, user device 110 is shown as outputting authentication request 1008, which includes gestures for detection by radar 1004 using radio waves 1006. In response to performing the sequence of gestures in authentication request 1008, 3D data of user 102 may be captured by radar 1004, and the 3D data may be used to authenticate user 102 as being human and also as receiving the instructions to answer the authentication request (e.g., a trusted party). In some embodiments, authentication request 1008 may also include instructions with requests known only to user 102 (or a limited number of people) or capable of being performed by user 102 based on knowledge or objects particular to user 102, thereby also authenticating an identify of user 102. If the 3D data passes (e.g., matches, within a degree of error) authentication request 1008, user 102 may be allowed access to access location 1000 by unlocking door 1002. Authentication of user 102 may also be based on user data for user 102, for example, if gestures/motions detected would be performed by user 102 based on user 102's body properties.

In some embodiments, a third party may provide gestures through a remote device to give access to user 102 to door 1002. For example, a third party user may perform actions from a remote location for authentication request 1008 by performing such gestures, which may be used to unlock door 1002 when the gestures are detected by the third party's device and/or another remote radar detection device. The detected data and/or authentication through the remote detection devices may be transmitted to a lock or other component of door 1002 to allow user 102 access to door 1002. In some embodiments, the third party may also communicate the gestures to user device 110 for recreation and output, which may then be detected by radar 1004 or transmitted to a processing unit for authentication.

Figure 2B:
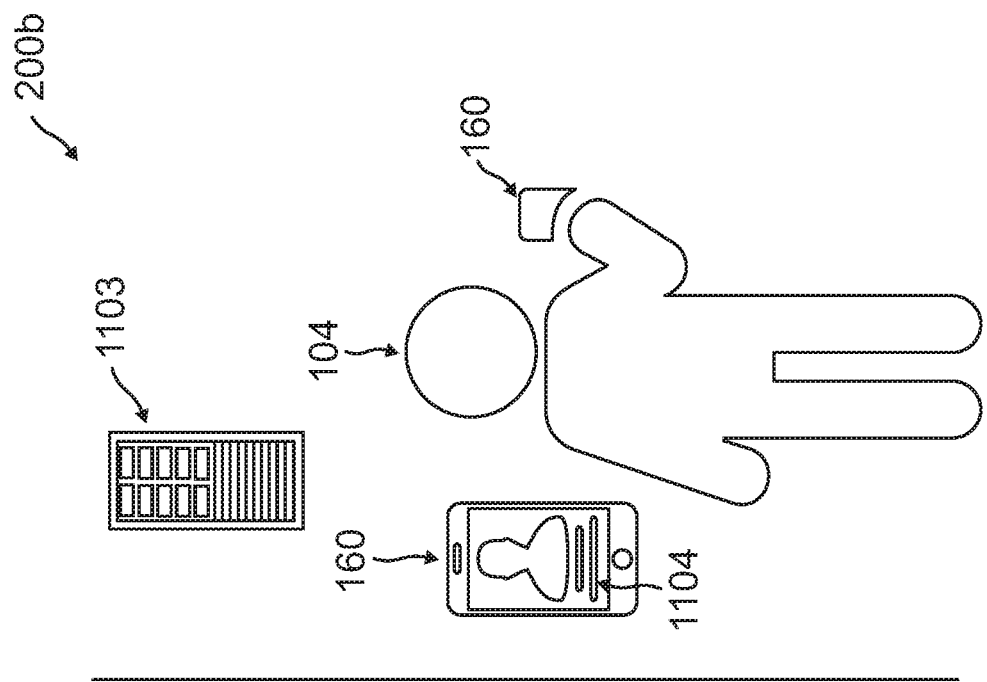
FIG. 2B is an exemplary real-world environment where a user may utilize gesture detection for authentication of the user on a device and access to an account, virtual item, an application, or other computer resource, according to an embodiment.
Figure 2B:
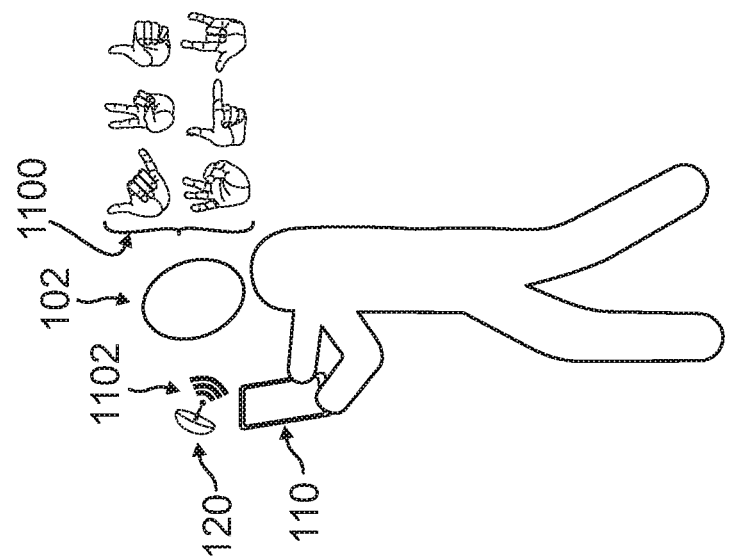

FIG. 2B is an exemplary real-world environment where a user may utilize gesture detection for authentication of the user on a device and access to an account, virtual item, an application, or other computer resource, according to an embodiment. Environment 200b of FIG. 2B includes user device 110 having radar detection components 120 discussed in reference to system 100 of FIG. 1. In this regard, user device 110 may display an authentication request based on a request to use a real or virtual item, object, account, location, or another thing by user 102. For example, user 102 may wish to utilize a real or virtual thing provided by a user 104. However, in other embodiments, other online service providers and entities may provide the real or virtual thing that user 102 requests access to.

In environment 200b, user 102 utilizes user device 110 to view authentication request 1100 that includes instructions, a challenge, and/or virtual displays or projections for completion by user 102 using a hand, fingers, or other body part, as well as real-world objects in some embodiments. Authentication request 1100 may be generated specifically for user 102 based on information known of user 102, such as the aforementioned user or location data. Authentication request 1100 may be output on user device 110 based on an access request by user 102 to a real or virtual thing, including a real or virtual resource provided by user 104 or an online digital entity. For example, authentication request 1100 may be to access an account and/or provide authentication for the account (e.g., a CAPTCHA-like test) that is managed by remote server 1103. The account may be controlled by user 102 and used to provide a payment or interact with user 104, or may be controlled by user 104 where user 104 is providing access to the account to user 102 through authentication request 1100. In this regard, authentication request 1100 may be used to authenticate user 102's identity and prevent bad actors from maliciously utilizing resources provided by remote server 1103.

In contrast to FIG. 2A, in environment 200b, user device 110 may both output authentication request 1100 and capture 3D data of user 102 performing gestures or actions in response to authentication request 1100. For example, a miniaturized radar component provided within, on, or connected to user device 110 by radar detection component 120 may capture 3D radar data of user 102 in response to authentication request 1100 using radio waves 1102 transmitted by radar detection component 120. Radio waves 1102 may be reflected when impacting user 102 while user 102 responds to authentication request 1100, and the resulting reflected waves may be detected by a receiving antenna of radar detection component 120. User device 110 and radar detection component 120 may rebuild object size, shape, location, movement (velocity/acceleration), and other data by utilizing resulting images received by radar detection component 120. User device 110 may then process the 3D radar data to determine whether the 3D data matches, completes, or otherwise solves authentication request 1100, and may authenticate user 102 based on the data (e.g., allow or deny access). In other embodiments, user device 110 may transmit the 3D data to another device/server for authentication, such as an online service provider that provides access to a virtual resource or user device 160 that authenticates user 102 to user 104.

In environment 200b, a user 104 may receive an authentication notification 1100 that identifies user 102 and displays that user 102 has been authenticated on a user device 160. In other embodiments, authentication notification may be received and/or processed by an online service provider or platform that requests authentication of user 102 and provides access to one or more online resources based on the authentication. Thus, although authentication notification 1100 is shown as displayed on user device 160 in FIG. 2B, it is understood that instead authentication notification 1100 may correspond to electronic signals that may provide authentication to user 102 to a virtual resource with an online digital entity.

Figure 2C:
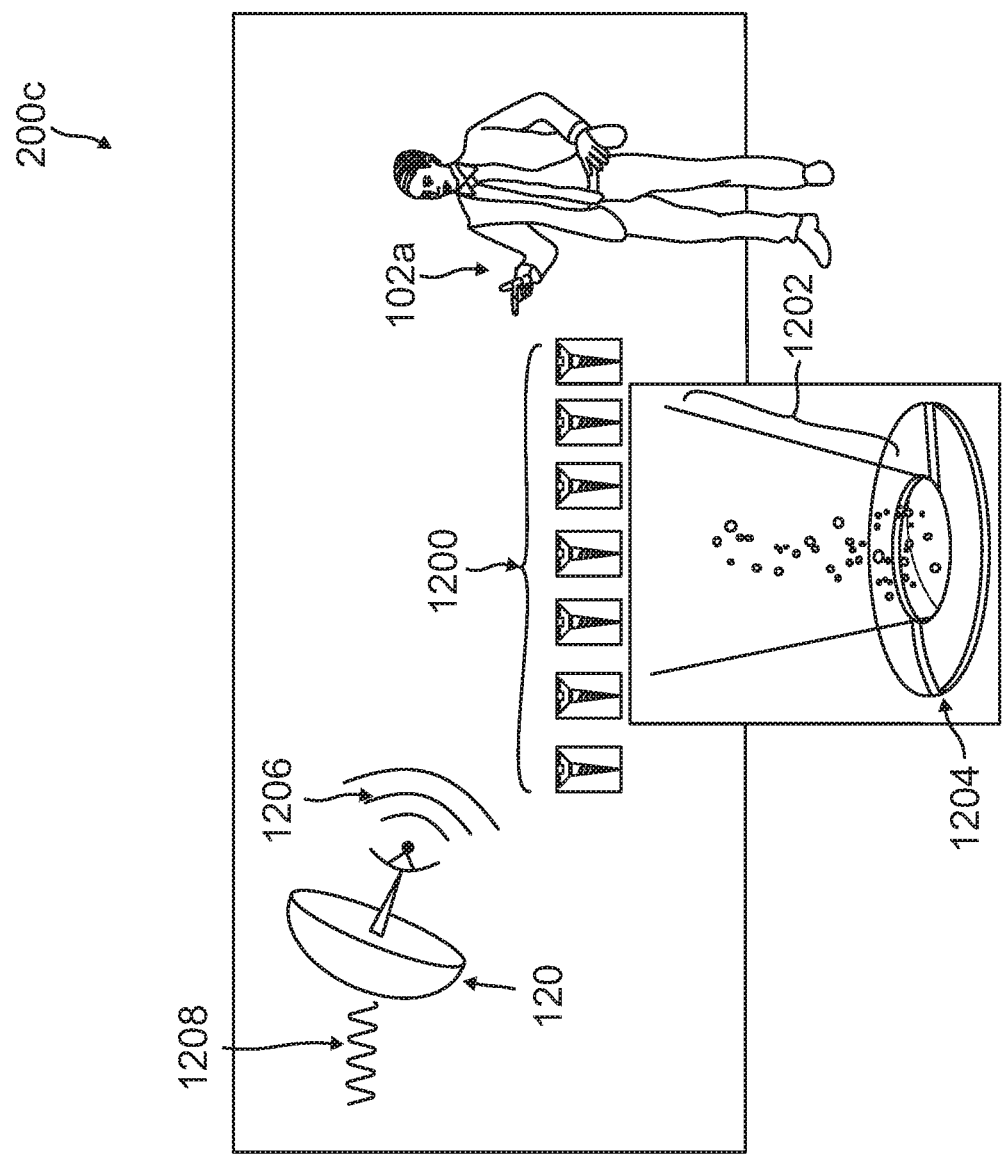
FIG. 2C is an exemplary authentication query output for a user to perform gestures detected by a device's radar component, according to an embodiment.

FIG. 2C is an exemplary authentication query output for a user to perform gestures detected by a device's radar component, according to an embodiment. FIG. 2C includes an environment 200c that displays a real-world environment of a miniaturized radar component capturing radar data of a user performing gestures and/or motions in response to a display authentication query having virtual objects. Although environment 200c includes virtual objects, it is understood that in other embodiments, real objects may instead or also be used, or no objects may be used and the user may respond to an authentication request using only gestures/motions.

In environment 200c, an authentication request 1200 displays a test or challenge for a user to complete with their hand 102a based on instructions provided to the user. For example, a user device may output authentication request 1200 and/or display instructions for completion of authentication request 1200. Authentication request 1200 is shown with seven screws as a portion of the query, each holographically projected into environment 200c by holograph 1202 using holographic device 1204. Holographic device 1204 may utilize holography to project a 3D image or video through holograph 1202, where the 3D image may be capable of being interacted with by the user through hand 102a. Additionally, as the holograph provides light images, the interference with radar detection may be nonexistent or minimal. Thus, radar detection is capable of fully imaging hand 102a as it interacts with holograph 1202 and responds to authentication request 1200.

Authentication request 1200 may further include audio, visual, and/or audiovisual instructions for hand 102a to perform gestures, motions, or other actions with the seven screws shown in authentication request 1200 by holograph 1202. The instructions may request that the user touch each of the screws in a certain order with hand 102a, or turn each of the screws in an order, amount, and/or direction. The instruction may be more complex by requesting that the user attempt to move screws, change screw color, respond to changes in the screws (e.g., color patterns), etc. Thus, authentication query 1200 may request that the user perform some action in environment 200c with respect to the virtual projection of the screws by holograph 1202.

During performance of these actions by hand 102a, radar detection component 120 may capture the movement, placement, and shape of hand 102c. For example, radar detection component 120 may utilize radio waves 1206 to determine whether hand 102a has grasped one or more of the screws, which screw was grasped, and a direction the screw was turned using radio waves 1206. 3D radio imaging data 1208 may be output by radar detection component 120, and 3D radio imaging data 1208 may be used to determine whether hand 102a properly responded to the challenge or instructions provided with authentication request 1200. Authentication of the user may also be based on the particular features or properties of hand 102a with respect to the user and known data of the user, as well as hand 102a's movement within environment 200c and the known location, spatial, and object data of environment 200c.

Figure 2D:
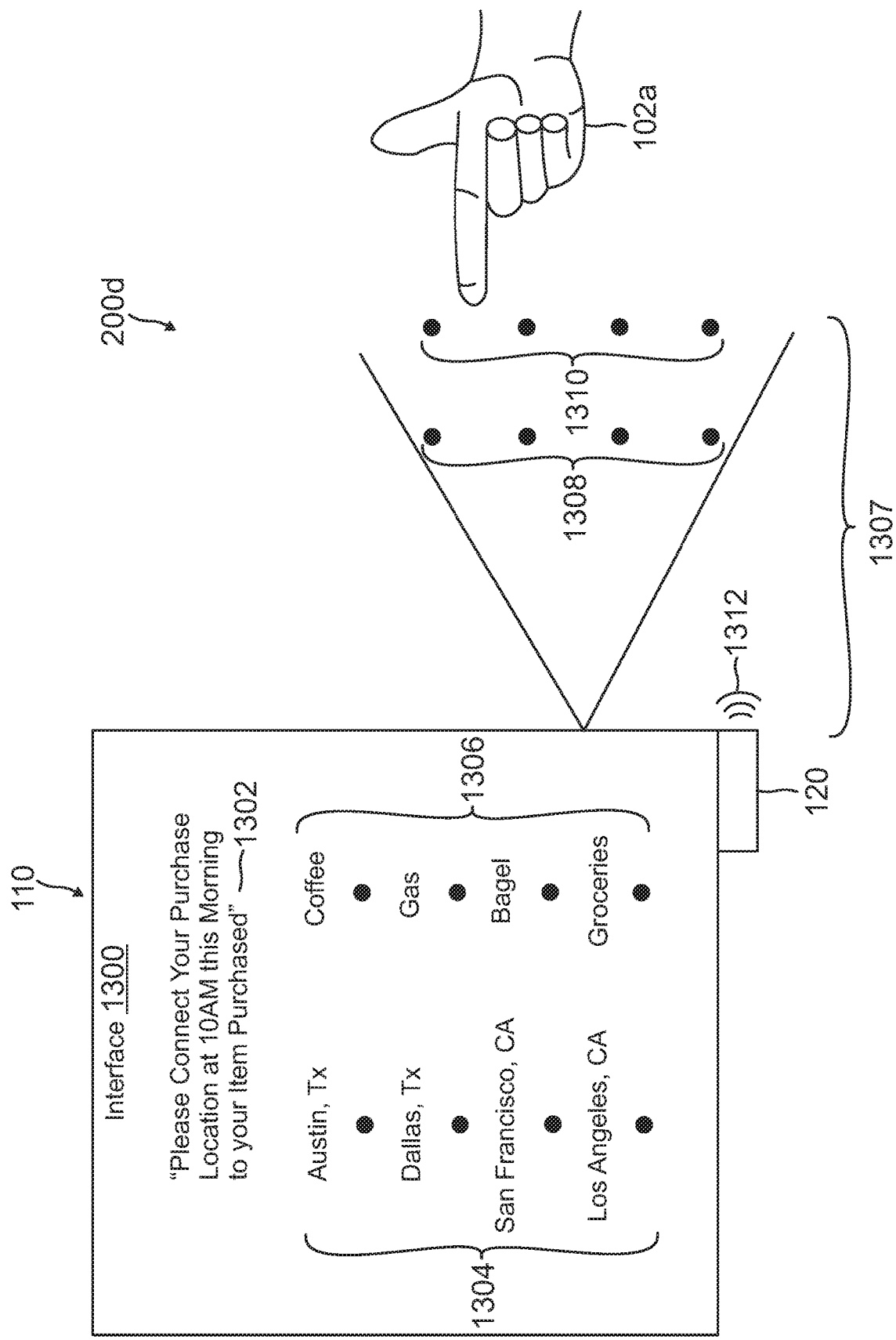
FIG. 2D is an exemplary authentication query output for a user to perform gestures based on transactional data for the user, according to an embodiment.

FIG. 2D is an exemplary authentication query output for a user to perform gestures based on transactional data for the user, according to an embodiment. As described below, in various embodiments, customizable security challenges may be presented to a user that require a combination of specialized 3D motion as well as knowledge of user data in order to know how to solve the 3D puzzle. Such data may include transactional data, but my also include other user-related data (e.g. account details, home mailing address, geographic location of a branch bank at which a user opened her first savings account, or innumerable other types of information that may only be known to a user, or at a minimum, difficult for a third party to learn). The combination of such data within 3D puzzles may make it especially challenging for an automated script (e.g., a bot) to gain access to particular online resources (e.g. web page content, account settings, transactional access to send or receive money, etc.). FIG. 2D includes an environment 200d that displays a real-world environment of a miniaturized radar component capturing radar data of a user performing gestures and/or motions in response to a display authentication query on a device interface and/or through a projection of virtual object. Although environment 200d includes virtual objects, it is understood that in other embodiments, real objects may instead or also be used, or no objects may be used, and the user may respond to an authentication request using only gestures/motions.

Environment 200d includes user device 110 and radar detection components 120 discussed in reference to system 100, as well as hand 102a discussed in reference to environment 200c. A user may view interface 1300 that outputs an authentication request 1302 that states: "Please connect your purchase location at LOAM this morning to your item purchased." The user may utilize hand 102a to respond to authentication request 1302 through gestures and motions that are captured by radar detection components 120. Authentication request 1302 may be used to access an account, perform electronic transaction processing using the account, and/or otherwise process data with an online service or payment provider that provides transaction processing services to the user. In other embodiments, authentication request 1302 may be used to provide other access and/or authentication, as discussed herein.

Authentication request 1302 may be generated utilizing transaction data (and other user-related data) available to an online service or payment provider, such as a transaction history for a user associated with hand 102a, account related details, and other information. The transaction history may comprise prior purchases by the user at physical and/or online locations, and may include a merchant purchased from, price totals, items purchased, locations of purchase, and other transactional data (e.g., tax, tip, etc.). Authentication request 1302 may be generated to correspond to specific transaction data known to the user, which may allow the user to respond to authentication request 1302 by knowing user-specific or privileged information. Authentication request 1302 may be generated to have "answers" or correct selections that may be captured to user gestures or motions based on the transaction history. For example, authentication request 1302 may be generated so that the user is required to acknowledge correct data from the user's transaction history.

When authentication request 1302 is generated, a transaction history for a user may be accessed and processed to generate a challenge that requires the user to utilize known knowledge of their transaction history to perform gestures or motions. In some embodiments, the challenge may require the user to point to correct answers and/or trace their finger from one correct answer to another or a start location to a correct answer using hand 102a. The user may be required to "connect the dots" or otherwise acknowledge the valid or correct information from the transaction history out of many different answers including incorrect answer. Thus, the challenge of authentication request 1302 may include a "multiple choice" type query where the user is required to point to correct answers and/or connect correct answers through motions and gestures performed using hand 102a. In some embodiments, a map may be presented where the user is required to acknowledge certain positions the user has visited and/or purchased items from on the map or trace a point from the map to other data. In other embodiments, the challenge of authentication request 1302 may be a different type of test, such as a matching test, a fill-in-the-blank type test, or another query where the user is required to designate or choose correct answers displayed to the user using hand 102a through knowledge of the user's transaction history.

Authentication request 1302 is shown in environment 200d with an exemplary challenge but may be customized using any of the aforementioned data and/or query parameters. In this regard, interface 1300 displays locations 1304 and items 1306 used to answer authentication request 1302. Locations 1304 and items 1306 may be used to answer authentication request 1302 by connecting the dots using hand 102a. A user associated with hand 102a may utilize hand 102a to move between a location where they purchased an item at 10 AM that morning to an item they purchased. For example, if the user purchased coffee at LOAM in Austin, Tex., hand 102a may move between those displayed dots on interface 1300. In some embodiments, authentication query 1032 may be displayed on interface 1300 and hand 102a may trace those dots using the displayed data on interface 1300. However, in other embodiments, projection 1307 may instead provide a holographic projection in 3D space so that holographic locations 1308 may be matched to holographic items 1310 using hand 102a.

Radar detection components 120 may capture hand 102a as hand 102a performs gestures and/or motions to connection one or more of locations 1304 to items 1306 and/or holographic locations 1308 to holographic items 1310. For example, on interface 1300, hand 102a may trace locations 1304 to items 1306 based on a user's transaction history that is known to the user. This may be captured through 3D data using radar detection component. In some embodiments where projection 1307 is shown in 3D space, holographic locations 1308 may be traced to holographic items 1310 in order to answer authentication request 1302. User device 110 and/or a remote service provider may then determine whether this response is correct, and if so, may authentication the user based on 3D data captured using radar detection component 120.

3D challenges that utilize transactional and/or other user related data can thus be highly customized and used in order to thwart bots (i.e., to prove that an entity accessing an online resource such as a web page and/or electronic account is actually a human). In addition to "connect the dots" type puzzles, overlay display images can also be used—for example, a user could be required to take actions such as the following: (1) point at a first location on a map of the city of Austin, Tex. where the user was located at 8:30 am that morning (which a service provider might know based on reported location information from a mobile device that has a custom application installed on it). (2) next, draw a straight line that connects the location in (1) to the location where a purchase was made at 8:55 am using a VISA™ credit card (via an NFC purchase on the mobile device). Note that for steps 1 and 2 (as well as others), the user can be prompted with several different choices shown prominently on a display, where only one of these choices may be correct. (3) A pop-up graphic is then displayed after the user picks the transaction location in (2), showing a few different options of merchandise. The user is then asked to "tap" each item (e.g. gesture in the air with finger) based on whether they purchased that item. So, if the user went to a coffee shop, the display in (3) might show a picture of a 12 oz hot coffee, a 16 oz bag of roasted coffee beans, a breakfast sandwich, an apple, and a daily newspaper. The user could then tap twice on the coffee graphic, and once on the apple, indicating they purchased two coffees and a piece of fruit (and nothing else). The 3D radar waves generated by the user's hand (or other gesturing device) can then be mapped to determine if they match the correct back-end data that may be maintained by a service provider/authenticator. As can be appreciated by one of skill in the art, innumerable different variations on a scenario such as that above can be presented to a user.

Figure 3:
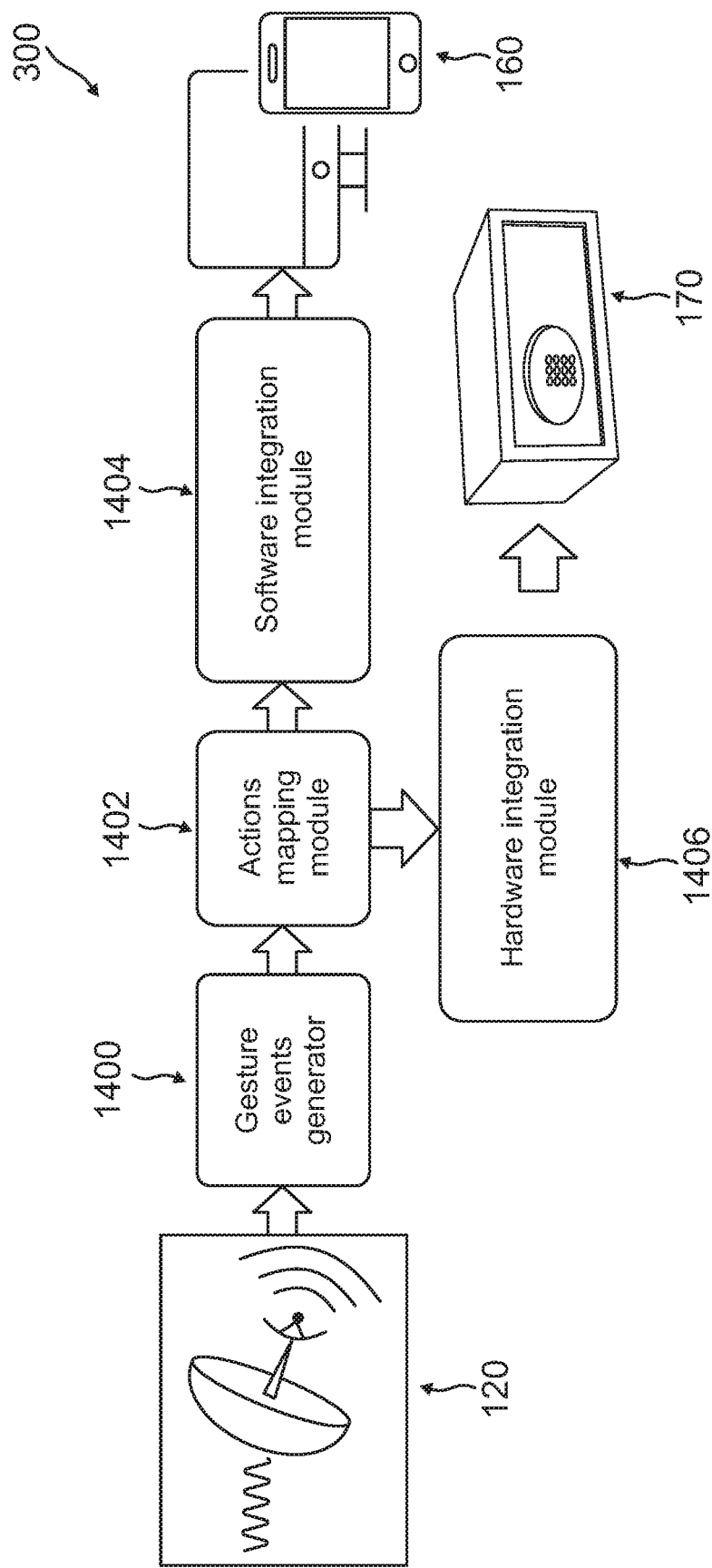
FIG. 3 is an exemplary system mapping for interactions between a miniaturized radar component and one or more devices to provide access to a user, according to an embodiment.

FIG. 3 is an exemplary system mapping for interactions between a miniaturized radar component and one or more devices to provide access to a user, according to an embodiment. System 300 of FIG. 3 includes a radar detection component 120 discussed in reference to system 100 of FIG. 1. Radar detection component 120 may interact with user device 160 and a hardware device 170 to provide one or more of the processes discussed herein.

In this regard, radar detection component 120 may be implemented within, on, or attached to a device capable of capturing 3D imaging data of a user using radar detection. Radar detection component 120 may provide gesture events generator 1400 for performance of some gesture or motion that is captured in 3D using radar detection. A user may perform the gesture or motion based on an authentication request displayed to the user through gesture events generator 1400, such as a challenge or query to perform some gesture/motion to authenticate the user for some operation. Gesture events generator 1400 may be provided by a user device and therefore output an authentication request by the device or may be provided by an online service provider to authenticate the user for some online feature.

Based on gesture events generator 1400, actions mapping module 1402 may capture 3D data of a user in response to the gesture events generator 1400 and may map the detected 3D data to one or more actions. Actions mapping module 1402 may process the 3D data to determine whether those gestures provided by the user correctly answer the authentication request and map to gestures, motions, or actions output based on gesture events generator 1400. In some embodiments, the detected radar data, such as reflected mmWave radio waves, may be converted to digital form and mapped to determine whether the reflected radio waves compare to known shapes, movements, actions, or objects. Thus, reflected radio waves that are detected by radar detection component 120 may be compared to known data to determine the gestures and motions of a user. Actions mapping module 1402 may be linked with a software integration module 1404 and/or a hardware integration module 1406 in order to perform authentication of a user and provide access to a real or virtual thing. For example, software integration module 1404 may be provided with user device 160 so that a user performing the gesture or motion may be provided access to an account, application, operation, or service provided on user device 160 (e.g., with an on-device process or online resource/entity). For example, a user may be logged into an account after responding to the 3D authentication query or may be provided with secure access to an online platform, resource, or other computing process that requires authentication. The access may also include access to real locations, such as by providing secure access to a save, door, enclave, vehicle or other physical area. For example, a door may open, or an electronic lock may be disengaged to allow for the access. This may allow a user to thereby authenticate themselves and access a process.

In other embodiments, a hardware integration module may integrate with a hardware device 170 that prevents access to unauthorized users to a specific location or thing. Hardware device 170 may correspond to a safe, door lock, or other electronic lock that integrates with a physical lock to prevent access to users to a location or item. Hardware device 170 may include hardware integration module 1406 that allows access to the location or item if a user can authenticate themselves using a gesture or motion detected by radar detection component. Hardware integration module may therefore provide the access based on actions mapping module 1402 that process the gesture/motion performed by the user and captured using radar detection component 120.

Figure 4:
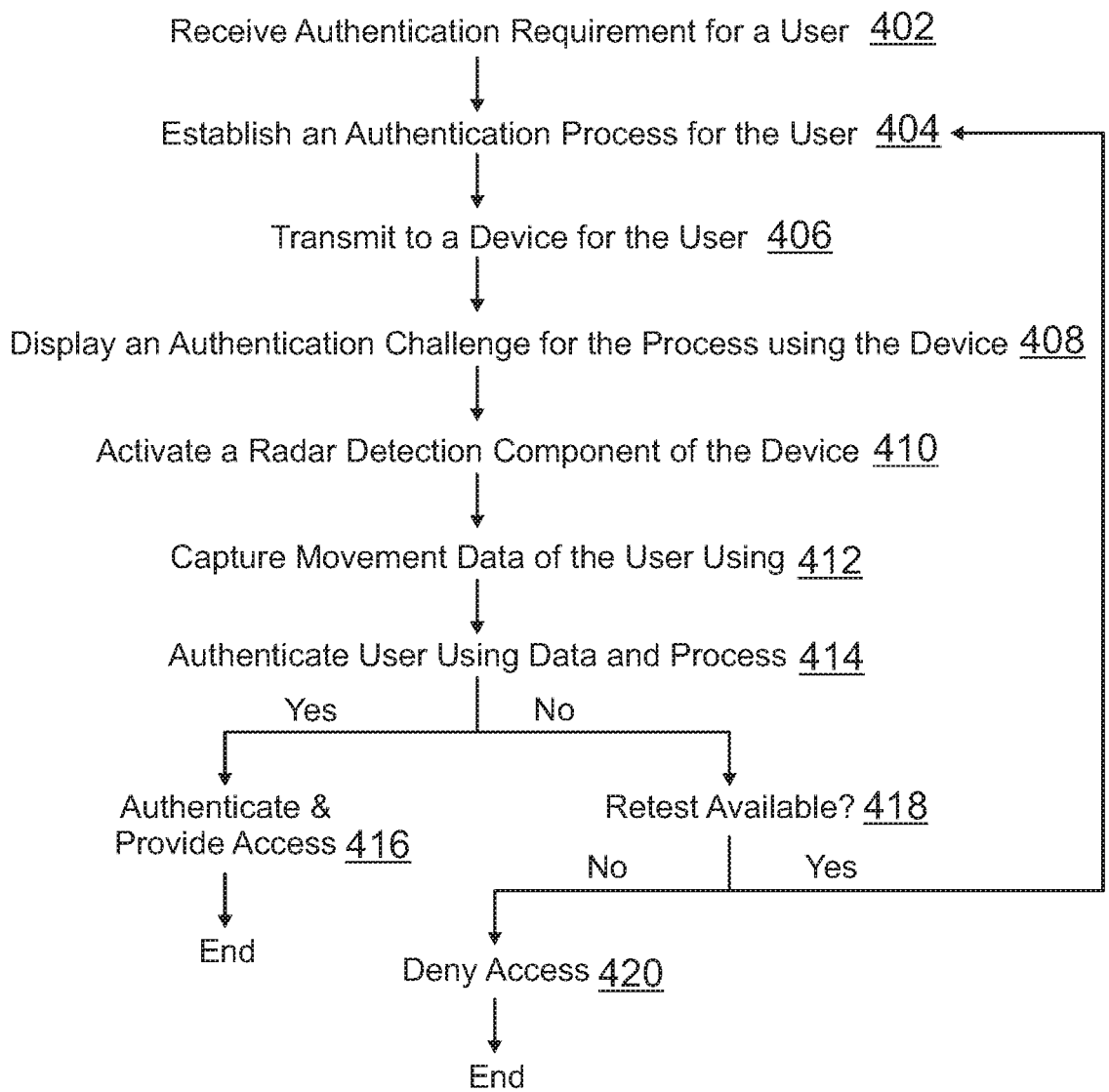
FIG. 4 is a flowchart of an exemplary process for gesture and motion detection using a device radar component for user authentication, according to an embodiment.

FIG. 4 is a flowchart of an exemplary process for gesture and motion detection using a device radar component for user authentication, according to an embodiment. Note that one or more steps, processes, and methods described herein of flowchart 400 may be omitted, performed in a different sequence, or combined as desired or appropriate.

At step 402 of flowchart 400, an authentication requirement for a user is received, for example, in response to an access request by the user. The authentication requirement may be requested by another user to authenticate the user and provide the access. However, in other embodiments, the authentication requirement may be received or detected based on a request by the user to access a real or virtual object, service, account, or item. For example, the user may wish to access an account, and a service provider may request that the user authenticate themselves and respond to a CAPTCHA-like challenge.

At step 404, an authentication process is established for the user that requests the user to perform gesture or motion. The authentication process may include instructions to perform the gesture/motion, as well as other real or virtual objects with which to perform the gesture/motion. Moreover, the authentication process may be determined based on data specific to the user, such as user information, a user profile, and/or location information in an environment or proximity of the user. Once the process to authenticate the user is selected or generated, the process may be sent to a device for the user, at step 406. The device may therefore output an authentication request to the user, where the user is required to perform a gesture/motion based on the authentication process, instructions, and/or challenge.

The authentication challenge is displayed to the user, at step 408, which may display instructions or a query for the user to perform the gesture(s) and/or motion(s). In some embodiments, a virtual display or projection associated with the authentication challenge may be displayed with the authentication challenge, which may include prompts or displays necessary to complete the challenge. A radar detection component of the device is activated, at step 410, which may correspond to a miniaturized radar of a mobile device or other computing device. The radar detection component may capture and process 3D radar detected data of a user in response to the authentication challenge. Thus, at step 412, movement and other data of the user is captured using the radar detection component. The data may correspond to 3D radar detected data that is mapped using scattered radio waves by the user while performing the gesture/motion. The 3D data of the user may be used to authenticate the user based on the process, such as the displayed challenge, at step 414.

If the user can be properly authenticated at step 414, then at step 416 the user is provided with the requested access. Thereafter, flowchart 400 may end and the user may be properly authenticated. However, if the user is not authenticated, it may be determined whether a retest is available, at step 418, which may request the user to reperform the gesture/motion and/or may generate and output a new authentication challenge to perform some other or additional gesture/motion. If no retest is available, at step 420, the user is not authenticated and is denied the access that was requested. However, if a retest is available, flowchart 400 may return to step 404 where an authentication process for the user is established to provide the access requested by the user.

Figure 5:
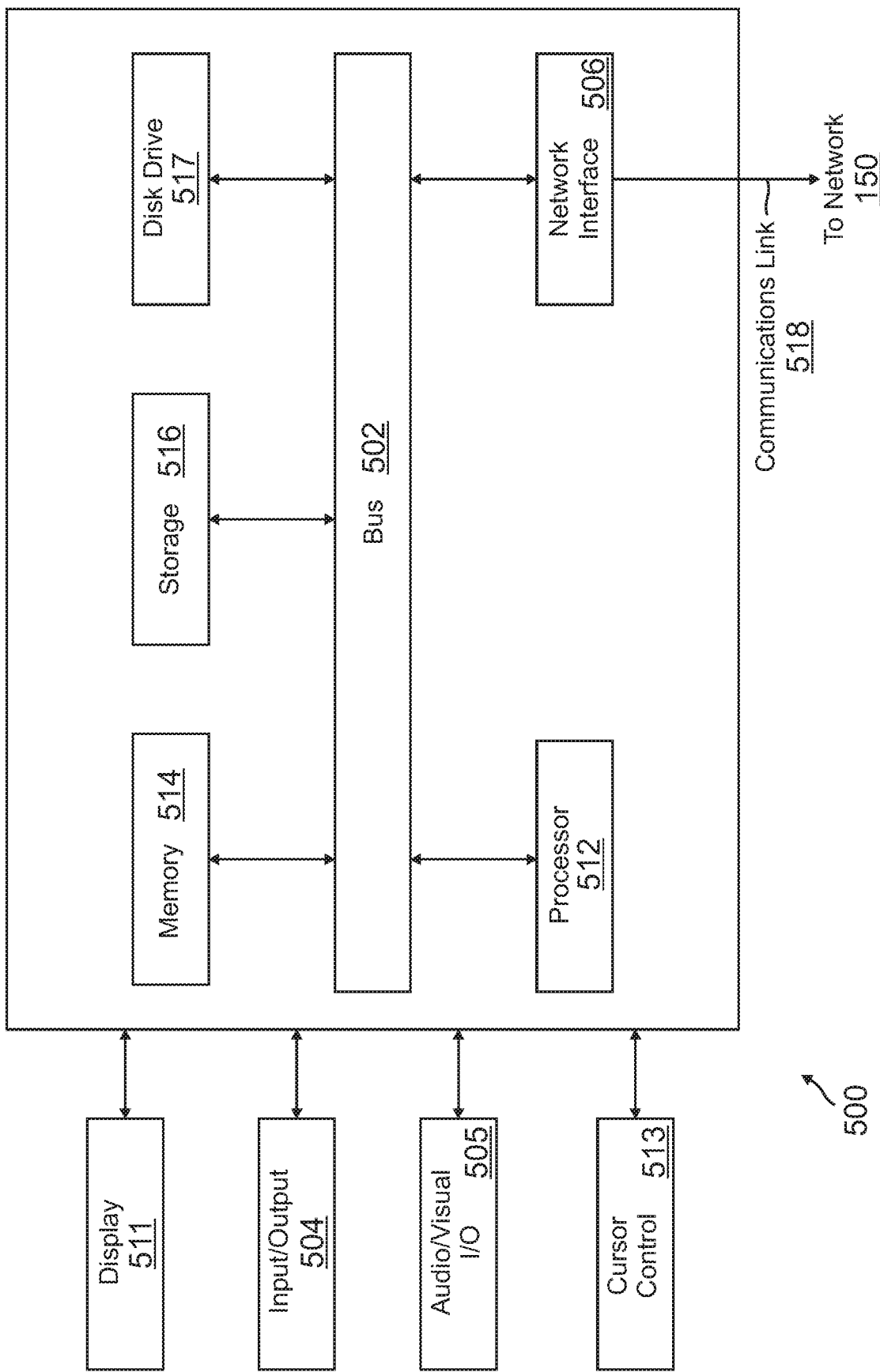
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A first device comprising:
a three-dimensional object detection component;
a non-transitory memory storing instructions; and
one or more hardware processors coupled to the non-transitory memory and configured to read the instructions from the non-transitory memory to cause the first device to perform operations comprising:
receiving an access request by a first user;
determining a selected authentication process by a second user that authenticates the first user for the access request using the three-dimensional object detection component;
determining a physical user parameter associated with a body of the first user that is associated with a completion of the selected authentication process by the first user;
accessing a transaction history for the first user, wherein the transaction history has a plurality of previous transactions engaged in by the first user over a time period;
determining, based on the selected authentication process, two or more of the plurality of previous transactions at two or more locations and one or more items in the two or more of the plurality of previous transactions;
generating an authentication request for the completion by the first user based on the selected authentication process and the physical user parameter, wherein the completion of the selected authentication process during the authentication request requires that the first user identify the two or more locations and the one or more items;
outputting the authentication request that uses the three-dimensional object detection component to authenticate the first user;
capturing, using the three-dimensional object detection component, three-dimensional object data responsive to the outputted authentication request for an object within a detection range of the three-dimensional object detection component; and
determining whether the first user is authenticated for the access request based on the selected authentication process, the physical user parameter, and the three-dimensional object data for the outputted authentication request.

2. The first device of claim 1, wherein the three-dimensional object detection component comprises a radar system.

3. The first device of claim 1, wherein the three-dimensional object data comprises at least one of a movement of the object, a pattern of the movement, a placement of the object in relation to the first device, or an orientation of the object in relation to the first device.

4. The first device of claim 1, wherein the object comprises at least one of a hand or one or more fingers of the hand of the first user, wherein the selected authentication process is performed using the hand, and wherein the capturing the three-dimensional object data comprises recording a performance of the hand using the three-dimensional object detection component.

5. The first device of claim 1, wherein the authentication request requests that the first user perform at least one of a movement or an orientation of the object in a real-world environment to identify the two or more locations and the one or more items with the outputted authentication request.

6. The first device of claim 5, wherein the outputting the authentication request comprises:
displaying one of a holographic image or a display screen image for the authentication request, wherein the one of the holographic image or the display screen image comprises display data for performance of the at least one of the movement or the orientation.

7. The first device of claim 1, wherein the operations further comprise:
determining a location of the first device,
wherein the selected authentication process is based on the location.

8. The first device of claim 7, wherein the operations further comprise:
determining location information for the location, wherein the location information comprises real-world objects within the location, wherein the selected authentication process comprises a movement of the object based on the location information.

9. The first device of claim 1, wherein the access request is associated with a use of a transaction processing service provided by a service provider, wherein the generating the authentication request comprises:
receiving the authentication request from the service provider, based on the access request, two or more of the plurality of previous transactions at the two or more locations, and the one or more items,
wherein the determining whether the first user is authenticated comprises communicating the three-dimensional object data to the service provider and receiving an authentication result from the service provider based on the three-dimensional object data.

10. The first device of claim 1, wherein the access request is associated with a use of the first device, and wherein the authentication request is further generated based on the selected authentication process for the use of the first device.

11. A method comprising:
receiving an access request from a device of a first user;
determining a challenge selected by a second user that authenticates the first user for the access request;
determining a physical user parameter associated with a body of the first user that is associated with a completion of the challenge by the first user;
accessing a transaction history for the first user, wherein the transaction history has a plurality of previous transactions engaged in by the first user over a time period;
determining, based on the challenge, two or more of the plurality of previous transactions at two or more locations and descriptive information corresponding to the one or more items in the two or more of the plurality of previous transactions;
generating, by a service provider based on user data for the first user, the challenge, and the physical user parameter, a three-dimensional authentication process associated with the service provider, wherein the three-dimensional authentication process comprises the challenge to perform a three-dimensional gesture by the first user that is captured using radio waves by a radar component of the device, and wherein the completion of the challenge during the three-dimensional authentication process requires that the first user identify the two or more locations and the descriptive information corresponding to the one or more items when performing the three-dimensional gesture; and
transmitting the three-dimensional authentication process to the device of the first user.

12. The method of claim 11, wherein the determining the challenge comprises receiving the challenge from the second user for authenticating the first user for access to one of a location associated with the second user, an online account of the second user, or an electronic lock controlled by the second user.

13. The method of claim 11, further comprising:
receiving three-dimensional data corresponding to an action performed by the first user from the device, wherein the three-dimensional data is captured by the device using the radar component responsive to three-dimensional authentication process;
comparing the three-dimensional data to the challenge that requires that the first user identify the two or more locations and the descriptive information corresponding to the one or more items when performing the three-dimensional gesture; and
authenticating the first user based on the comparing.

14. The method of claim 11, further comprising:
transmitting solution data for the challenge to the device, wherein the solution data comprises required three-dimensional data detected by the radar component of performance of the three-dimensional gesture.

15. The method of claim 11, further comprising:
transmitting a message comprising instructions for completion of the challenge by the first user.

16. The method of claim 15, wherein the determining the challenge comprises selecting the challenge for performance by the first user based on location data for a location of the first user, wherein the location data comprises at least one of spatial data at the location, physical objects within the location, or additional users at the location.

17. A system comprising:
a non-transitory memory storing instructions; and
one or more hardware processors coupled to the non-transitory memory and configured to read the instructions from the non-transitory memory to cause the system to perform operations comprising:
receiving, by an authentication server, a request to authenticate a user;
determining a challenge selected by another user that authenticates the user for the request;
determining a physical user parameter associated with a body of the user that is associated with a completion of the challenge by the user;
accessing a transaction history for the user, wherein the transaction history has a plurality of previous transactions engaged in by the user over a time period;
determining, based on the challenge, two or more of the plurality of previous transactions at two or more locations and one or more items in the two or more of the plurality of previous transactions;
responsive to the request, generating an authentication query comprising the challenge to perform a three-dimensional action by the user based on data specific to the user and the physical user parameter, wherein the completion of the challenge during the authentication query requires that the user identify the two or more locations and the one or more items when performing the three-dimensional action;
transmitting the authentication query to a device of the user;
receiving radar data captured by the device using a radar component responsive to the authentication query, wherein the radar data comprises a movement of the user detected using the radar component; and
authenticating the user based on the three-dimensional action and the radar data for the authentication query.

18. The system of claim 17, wherein the challenge further requests that the user perform the three-dimensional action using a body part of the user with at least one of a virtual projection of an item in an area of the device or a real item within the area.

19. The system of claim 17, wherein the one or more items in the two or more of the plurality of previous transactions is a single item included in a first of the two or more previous transactions but not in any of the other two or more previous.

20. The first device of claim 1, wherein the completion of the selected authentication process during the authentication request further requires that the first user trace between the two or more locations on a virtual map displayable by the first device and select the one or more items from a plurality of virtual item images displayable by the first device.

* * * * *